United States Patent
Munson et al.

(10) Patent No.: US 11,419,304 B2
(45) Date of Patent: Aug. 23, 2022

(54) LONG WALK LITTER BOX

(71) Applicants: J. Brent Munson, Sikeston, MO (US); William G. Dorris, Sikeston, MO (US)

(72) Inventors: J. Brent Munson, Sikeston, MO (US); William G. Dorris, Sikeston, MO (US)

(*) Notice: Subject to any disclaimer, the term of this patent is extended or adjusted under 35 U.S.C. 154(b) by 179 days.

(21) Appl. No.: 16/294,665

(22) Filed: Mar. 6, 2019

(65) Prior Publication Data

US 2019/0274273 A1   Sep. 12, 2019

Related U.S. Application Data

(60) Provisional application No. 62/639,057, filed on Mar. 6, 2018.

(51) Int. Cl.
*A01K 1/01* (2006.01)

(52) U.S. Cl.
CPC .......... *A01K 1/0114* (2013.01); *A01K 1/0107* (2013.01)

(58) Field of Classification Search
CPC .............................. A01K 1/0107; A01K 1/0114
USPC .......................................................... 119/165
See application file for complete search history.

(56) References Cited

U.S. PATENT DOCUMENTS

| | | | | |
|---|---|---|---|---|
| 2,741,223 A * | 4/1956 | Winborn, Jr. | ........ | A01K 1/0107 119/165 |
| 3,885,523 A * | 5/1975 | Coleman | .............. | A01K 1/0107 119/165 |
| 5,092,277 A * | 3/1992 | Baillie | .................. | A01K 1/0107 119/165 |
| 5,355,837 A * | 10/1994 | Reyes | .................. | A01K 1/0107 119/161 |
| 5,531,186 A * | 7/1996 | Flood | .................... | A01K 1/0114 119/166 |
| 5,699,754 A * | 12/1997 | Cahajla | ................ | A01K 1/0107 119/165 |
| 5,769,026 A * | 6/1998 | Kohn | .................... | A01K 1/0107 119/165 |
| 5,806,461 A | 9/1998 | Kiera | | |
| 6,371,048 B1 * | 4/2002 | Smith | .................. | A01K 1/0114 119/166 |

(Continued)

FOREIGN PATENT DOCUMENTS

| | | | | |
|---|---|---|---|---|
| CH | 694004 A5 * | 6/2004 | .......... | A01K 1/0114 |
| JP | 2013116060 A * | 6/2013 | .......... | A01K 1/0114 |

OTHER PUBLICATIONS

English-language translation of JP 2013/116060 (Year: 2013).*

*Primary Examiner* — Lisa L Tsang
(74) *Attorney, Agent, or Firm* — Charles McCloskey

(57) ABSTRACT

A long walk litter box has a lid upon a base of rectangular prismatic form. The base has four walls upon a bottom and the lid has four matching walls matching those of the bottom. The walls of the lid receive a top opposite the bottom of the assembled box. One wall of the lid has an entry for a cat into the box. Upon the walls of the bottom, the box has a perforated walkway where the cat walks. The walkway rests upon catches within the bottom. The catches present angled surfaces that receive litter from the cat and gravity carries the littler down to the bottom. A cat enters the entry, walks around the walkway, hops into the bottom, climbs onto the walkway, walks around the walkway again, and exits. All litter that drops from the cat enters the perforations for collection in the bottom.

1 Claim, 6 Drawing Sheets

(56) References Cited

U.S. PATENT DOCUMENTS

| | | | | |
|---|---|---|---|---|
| 6,659,045 B2* | 12/2003 | Thompson | ............ | A01K 1/0107 |
| | | | | 119/482 |
| 6,945,193 B1* | 9/2005 | Tanner | ................. | A01K 1/0107 |
| | | | | 119/165 |
| 9,258,977 B1* | 2/2016 | Hilger | ................. | A01K 1/0125 |
| D813,472 S * | 3/2018 | Veness | ......................... | D30/161 |
| 10,375,923 B2* | 8/2019 | Remick | .................... | A01K 1/01 |
| 2002/0000205 A1* | 1/2002 | Yamamoto | ........... | A01K 1/0114 |
| | | | | 119/161 |
| 2005/0263089 A1* | 12/2005 | Hirokawa | ............ | A01K 1/0107 |
| | | | | 119/165 |
| 2014/0069342 A1* | 3/2014 | Khalili | ................. | A01K 1/0114 |
| | | | | 119/165 |
| 2015/0020743 A1* | 1/2015 | Bauer | .................. | A01K 1/0107 |
| | | | | 119/166 |

\* cited by examiner

# LONG WALK LITTER BOX

CROSS-REFERENCE TO RELATED APPLICATION

This non-provisional application claims priority to provisional application No. 62/639,057 filed on Mar. 6, 2018 which is owned by a common inventor.

BACKGROUND OF THE INVENTION

The present invention relates to feline litter boxes. The long walk litter box has particular utility with collecting litter over a longer distance and into a central container.

The long walk litter box is desirable for collecting litter from the paws of a cat before the cat exits the box. The long walk litter box minimizes the cat litter tracked outside of it. Owners and others dislike stepping upon cat litter when barefoot or wearing socks. Even when wearing shoes, owners resist having litter appear away from the litter box, especially upon flooring of a contrasting color to the litter. Cats being somewhat solitary creatures seek out confined, small spaces to hide and to rest. Some cats though also prefer a clean litter area and take steps to avoid dirty litter. Such steps may leave bits of litter behind on a floor or upon the fur of a cat later left elsewhere.

From time to time, an owner receives inspiration to limit the travels of litter through a home. Owners may place a littler box upon a sheet or other floor covering and take up the sheet for regular cleaning. That though gives the cat owner one more thing to do. Other owners may place the litter box inside of a larger cardboard box. In time, the owner has to remove the litter box from the cardboard box and then dispose of the cardboard box. That though gives the cat owner still more work to do. Other cat owners may locate a litter box in a basement, closet, or garage so the cat may track litter in a location less often seen by the owner and his guests. However, these litter control methods and devices burden the owner with more upkeep for his cat and may impinge the sociability of the cat.

Many cat fanciers and others who keep animals in a home, apartment or other such living space provide devices variously known as litter boxes or kitty litter boxes, so that the animal may be left unattended for relatively long periods of time. These litter boxes have a generally rectangular pan like shape and may include a ramp. A cat enters the litter box, eliminates waste, pushes the litter upon the waste, and then leaves the litter box. The cat may do so by jumping over a wall of the litter box or walking down a ramp. In doing so, the cat takes some litter with it through the hairs upon the cat's paws. Litter has often appeared three or four feet from a litter box, even one with a carpeted ramp. Litter comes in various kinds and from a variety of manufacturers thus litter may appear great or small distances from a litter box.

DESCRIPTION OF THE PRIOR ART

People though still love their cats and keep them, even with the litter tracked into a home. Over the years, cat owners have deployed various devices to capture litter and prevent litter from leaving the litter box when the cat does.

At one time, the U.S. Pat. No. 5,806,461 to Kiera showed a catwalk litter box with a hood portion placed upon a lower portion. The lower portion retained the cat litter while the hood portion provided privacy for the cat and concealment of the cat's waste elimination from the cat's owner. The hood portion has within it a perforate walkway adjacent to an interior wall.

Though the preceding description has referred to residential settings, the description also applies to cats kept in light industrial and other facilities for rodent control. While the above-described devices fulfill their respective, particular objectives and requirements, the aforementioned devices do not describe a long walk litter box that captures all of the residual litter from a cat's paws.

Therefore, a need exists for new and improved long walk litter box that can be used for capture of paw borne litter within a residence. In this regard, the present invention substantially fulfills this need. In this respect, the long walk litter box according to the present invention substantially departs from the conventional concepts and designs of the prior art, and in doing so provides a device primarily developed for the purpose of capturing litter from the paws, lower legs, and fur of a cat who has used the box in a home, an office, a light industrial setting, and the like.

The long walk litter box overcomes the above-mentioned disadvantages and drawbacks of the prior art. As such, the general purpose of the present invention, which will be described subsequently in greater detail, is to provide a new and improved long walk litter box which has all the advantages of the prior art mentioned heretofore and many novel features that result in long walk litter box which are not anticipated, rendered obvious, suggested, or even implied by the prior art, either alone or in any combination thereof.

SUMMARY OF THE INVENTION

The long walk litter box has a lid upon a base with both of a generally rectangular prismatic form. The base has four walls upon a bottom and the lid has four matching walls that match those of the bottom. The walls of the lid receive a top generally opposite the bottom of the assembled box. One wall of the lid has an entry that admits a cat into the box. Upon the walls of the bottom, the box has a perforated walkway upon which a cat proceeds. The walkway rests upon three catches within the bottom. The catches present angled, sloped surfaces that descend and approach the bottom. The catches receive litter that drops from the cat and gravity carries the littler down the catches to the bottom. A cat enters the entry, walks around the walkway, hops into the bottom, does its business, climbs onto the walkway, walks around the walkway in the opposite direction, and exits the box. All litter that drops from the cat, enters the perforations of the walkway for collection in the bottom.

An alternate embodiment of the invention includes a lid with rounded edges and corners between the walls and the top, a base with rounded corners between its walls and the bottom, and variations in the number of perforations per lineal inch of the walkway.

There has thus been outlined, rather broadly, the more important features of the invention in order that the detailed description thereof that follows may be better understood and in order that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved long walk litter box that may be easily and efficiently manufactured and marketed to the consuming public.

Another object of the present invention is to provide a long walk litter box for capturing all of the litter that drops from a cat.

Another object of the present invention is to provide a long walk litter box that saves space for a pet owner.

Another object of the present invention is to provide a long walk litter box that collects litter in a central portion of its base.

Another object of the present invention is to provide a long walk litter box that avoids scratching a supporting surface, such as a floor.

Another object of the present invention is to provide a long walk litter box that guides captured littler inwardly under gravity.

Another object of the present invention is to provide a long walk litter box that limits deflection of its perforated walkway.

Another object of the present invention is to provide a long walk litter box for eliminating litter tracked outside of a litter box into a house thus saving time of a pet owner.

Another object of the present invention is to provide a long walk litter box that lessens the burdens and hassles upon a pet owner.

Another object of the present invention is to provide a long walk litter box that reduces the vacuuming and cleaning of floors by a pet owner and otherwise maintain litter boxes with less often bending, thus saving the pet owner's back.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
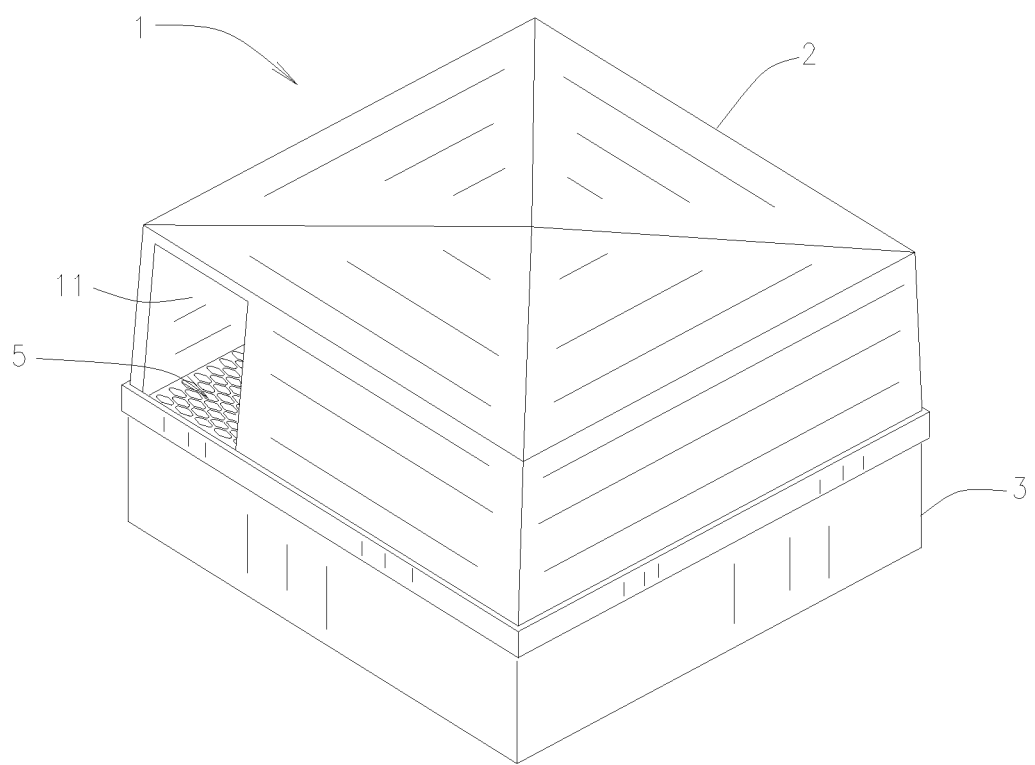
FIG. 1 is a perspective view of the preferred embodiment of the present invention.

Referring now to the drawings, and particularly to FIG. 1, a preferred embodiment of the long walk litter box of the present invention is shown by the reference numeral 1. In FIG. 1, the present invention 1 has a rectangular, prismatic, hollow lid 2 upon a cooperating rectangular, prismatic, hollow base 3. Both the lid and the base rest upon four common sides as shown. The base has four walls upon a bottom and the lid has four matching walls that fit upon those of the bottom in registration. The walls of the lid receive a top generally opposite the bottom of the assembled box. One wall of the lid has an entry 4 that admits a pet, such as a domestic housecat, or cat, into the box. Though a cat is foreseen, other pets may fit into the invention. Upon the walls of the bottom, the box has a perforated walkway 5 for movement of the cat. The walkway rests upon three catches within the bottom. The catches present angled surfaces that descend and approach the bottom. The catches receive litter that drops from the cat and gravity carries the littler down the catches to the bottom. A cat enters the entry, walks around the walkway, hops into the bottom, does its business, climbs onto the walkway, walks around the walkway in the opposite direction, and exits the box. All litter, that drops from the cat, enters the perforations of the walkway for collection in the bottom.

Figure 2:
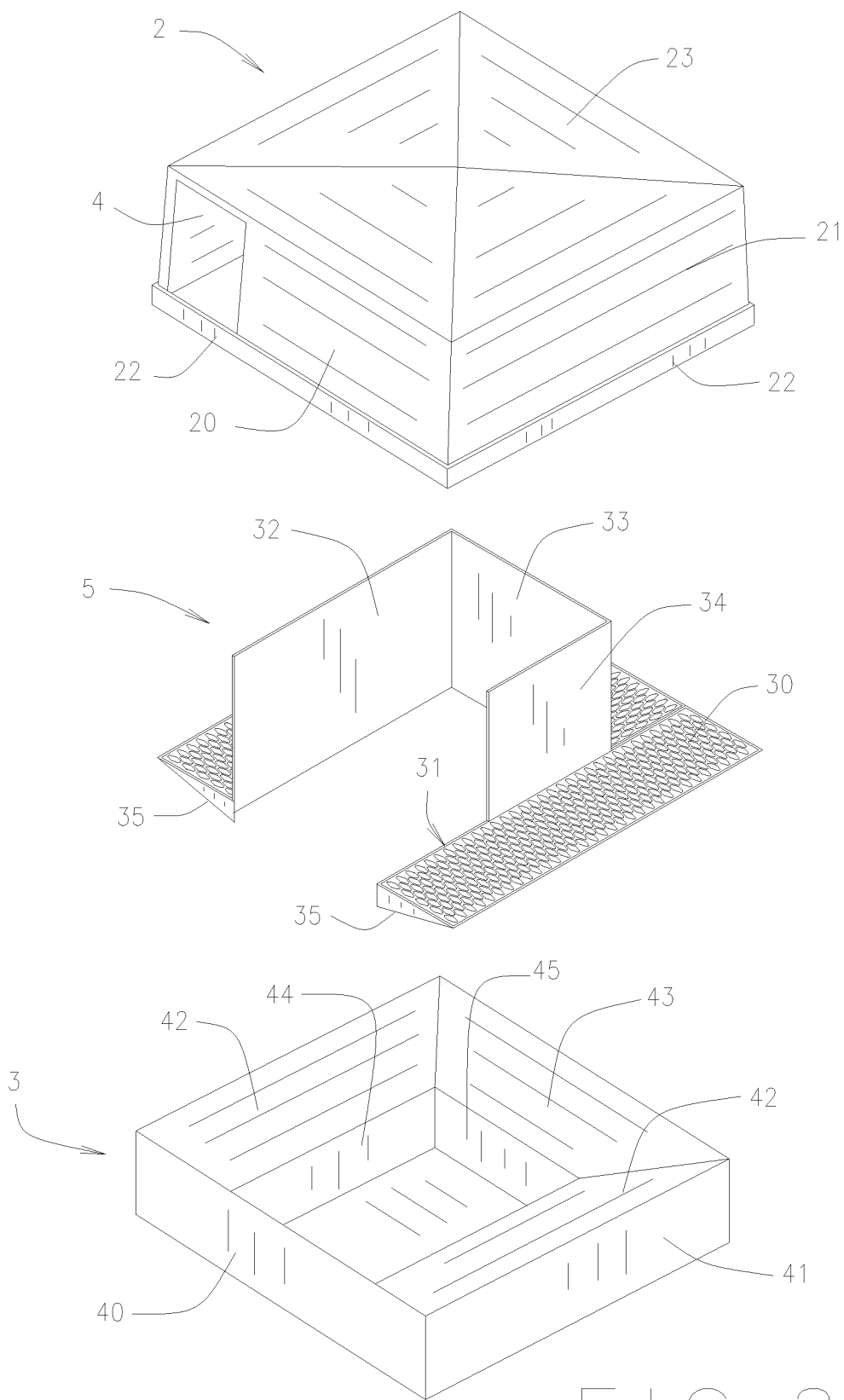
FIG. 2 is an exploded view of the present invention.

FIG. 2 shows an exploded view of the invention with the lid 2 towards the upper portion of this figure. The lid has four walls, generally mutually parallel in opposite pairs and spaced apart. The walls include as shown a front wall 20 preferably rectangular with its length generally parallel to a plane defined by a floor supporting the invention and its height markedly less than its length. The front wall includes the entry 4 that extends for nearly the height of the front wall and less than one quarter of the length of the front wall. Perpendicular to the front wall, the lid has a sidewall 21. This sidewall also has its length generally parallel to a plane defined by a floor supporting the invention and its height markedly less than its length. The sidewall 21 and the front wall 20 generally have the same height. Beneath the entry 4, the front wall has a rim 22 that extends for the length of the front wall and then continues along the sidewall defining a common plane. The sidewall and the front wall extend upwardly from the rim 22 and join to a top 23 here shown as rectangular, and more particularly, as square. In an alternate embodiment, the top has two ridges extending in an X like shape inwardly from the intersections of the front wall and the sidewall to their paired opposite walls.

Beneath the lid 2 in this figure, the box 1 has its perforated walkway 5 for movement of the cat. The walkway begins with a deck 30 having a generally planar form with a plurality of perforations therein. The deck has a generally U like shape and the open portion of the U orients towards the entry 4 upon assembly of the walkway 5 into the invention. The deck has an interior edge 31 that extends along the internal perimeter of the deck. The interior edge joins to a first wall 32, a second wall 33, and a third wall 34. The first wall, the second wall, and the third wall each have a perpendicular orientation to the walkway 5 and mutually extend towards the lid 2 upon assembly of the invention. The first wall joins to the second wall opposite the entry along a common corner. The second wall spans from the first wall and joins to the third wall generally diagonally from the entry. And the third wall spans partially along the deck for a length less than that of the first wall. The first wall 32 is mutually parallel and spaced apart from the third wall 34. The second wall 33 is perpendicular to both the first wall and the third wall. The first wall has the greatest length, the second wall has a smaller length than the first wall, and the third wall has the shortest length of the three walls. The three walls have the same height above the deck. Opposite the three walls, 32, 33, 34, the deck 30 joins to a plurality of stiffeners 35. This figure shows the triangular shaped stiffeners proximate the opening of the U shape of the walkway 5. The stiffeners orient with the base of their triangular shape inwardly, that is, towards one of the three walls and the point of their triangular shape outwardly, such as in towards the rim 22 of the lid 2.

The stiffeners permit the walkway 5 to rest upon three catches within the base 3. The base has a generally square form that cooperates with the lid 2. The base has a front wall 40 and a sidewall 41 perpendicular to it. The front wall and the sidewall have the same height and both extend upwardly from a common plane, here the bottom of the base as later shown and described. Rearward and inward from the front wall 40, the base has two side catches 42 mutually spaced apart and of mirror images and an opposite rear catch 43. The rear catch is generally perpendicular to the side catches and opposite the front wall. The two side catches and the rear catch have planar surfaces sloped downwardly and inwardly to the base. The slope of the planar surface matches the internal angle of the stiffeners 35 as previously described. The side catches descend to their lowest line at an inner side wall 44 and the rear catch descends to its lowest line at an inner rear wall 45. The catches present sloped surfaces that descend and approach the bottom. The catches receive litter that drops from the cat and gravity carries the litter down the catches to the bottom of the base. The inner side walls 44 are mutually spaced apart and parallel, and perpendicular to the front wall 40 and the bottom of the base. The inner rear wall 45 is perpendicular to both inner side walls 44 and the bottom of the base but parallel to the front wall 40. The spacing between the inner sidewalls and the inner rear wall provides room for a cat to do its business in a portion of litter placed within the invention.

Figure 3:
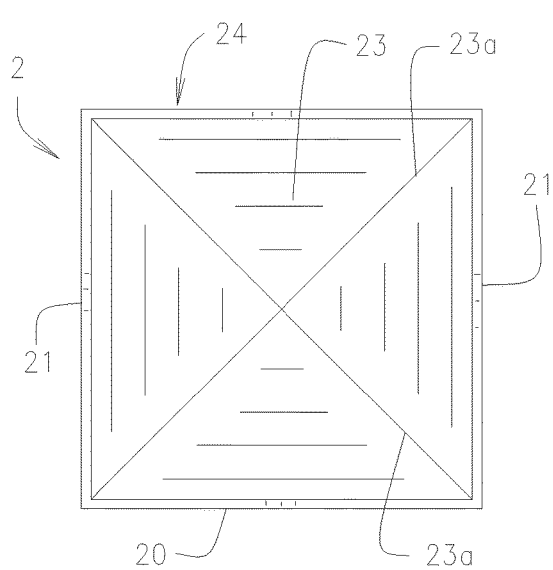
FIG. 3 is a plan view of the lid of the present invention.

Turning to the lid 2 itself, FIG. 3 shows the lid in a plan view. The lid 2 has a generally square shape with its front wall 20 mutually parallel and spaced apart from a rear wall 24. The front wall has two sidewalls 21 extending from it and being mutually parallel and spaced apart as they reach and join the rear wall 24. The front wall, the rear wall, and the sidewalls have the same height as later shown. Within the four walls, 20, 21, 24, the lid has its top 23. The top has a square shape as the four walls have the same length. In the preferred embodiment, the top has two ridges, 23a, shown that span from diagonally opposite corners where sidewalls intersect with the front wall and the rear wall. The ridges attain a generally X like shape as shown and stiffen the top. In an alternate embodiment, the lid has no ridges.

Figure 4:
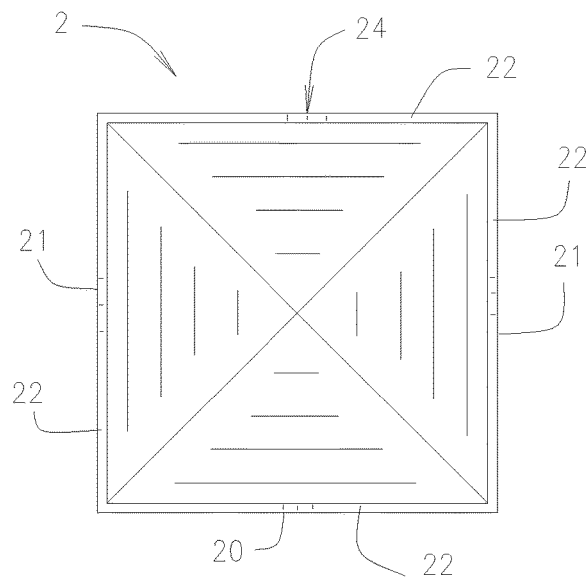
FIG. 4 is an opposite plan view of the lid.

Inverting the lid 2 from the view in FIG. 3, FIG. 4 is an opposite plan view with the rim 22 shown in the foreground of the figure. The rim connects the front wall 20 to the two sidewalls 21 and to the rear wall 24 in a square shape. The rim fits around the walkway 5 and cooperatively engages the walls of the base. This view also shows the underside of the top 23 and its ridges 23a.

Figure 5:
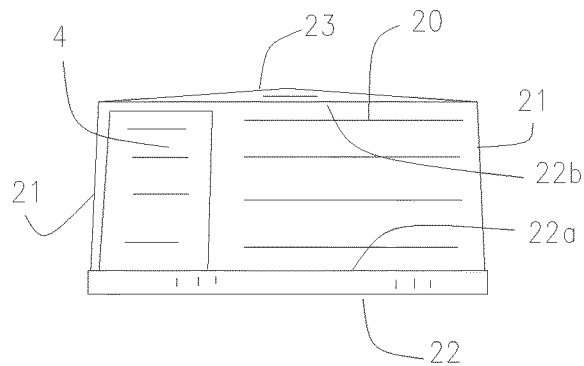
FIG. 5 is a front view of the lid.

The front wall 20 of the lid 2 has the entry 4 for a cat to go into the invention as in FIG. 5. The front wall 20 extends upwardly from the rim 22 and has a slightly trapezoidal shape with a narrower upper edge 22b than a lower edge 22a at the rim. The sidewalls, 21, here shown on their own edge angle inwardly from the rim 22 up to the top 23. The trapezoidal shape of the front wall and the inward angle of the sidewalls permit nesting of multiple lids. Inwardly from the upper edge 22b, the top 23 extends to its peak where the ridges 23a intersect, generally at the center of the lid. The entry 4 has a general position to the left of the front wall and proximate a sidewall.

Figure 6:
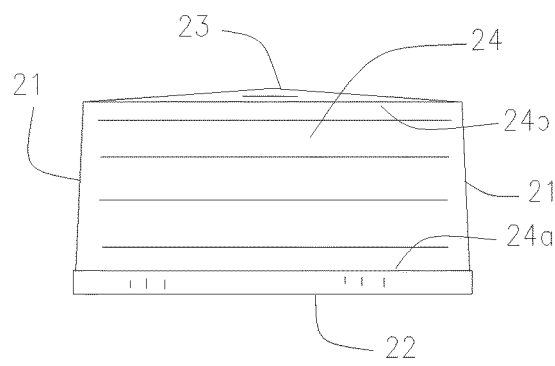
FIG. 6 is a back view of the lid.

Turning the lid 2, FIG. 6 has the rear wall 24 also having a slightly trapezoidal shape similar to that of the front wall with a narrower upper edge 24b than a lower edge 24a at the rim 22. The rear wall has a solid shape and joins to the two sidewalls, 21, here shown on their own edge. The sidewalls angle inwardly from the rim 22 up to the top 23. The trapezoidal shape of the rear wall and sidewalls' inward angle support nesting of multiple lids as during display upon a show floor at a pet store. Inwardly from the upper edge 22b, the top 23 extends to its peak where the ridges 23a intersect, generally at the center of the lid.

Figure 7:
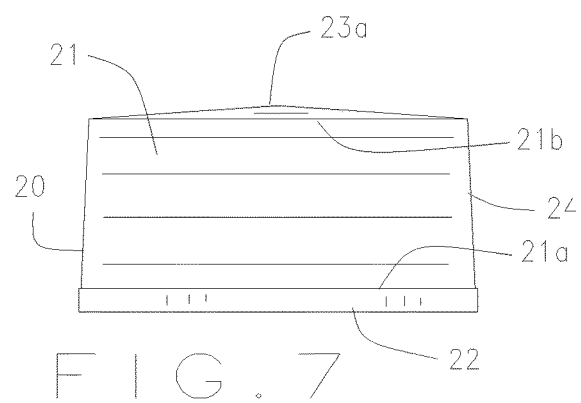
FIG. 7 is a side view of the lid.

FIG. 7 then shows one sidewall 21 spanning from the front wall 20 to the rear wall 24. The sidewall also has a trapezoidal shape similar to that of the front wall and the rear wall. The sidewall has a solid shape and joins to the front wall and the rear wall here shown on their own edges at common corners. The front wall and the rear wall angle inwardly from the rim 22 up to the top 23. The sidewall also has its shape formed from a narrower upper edge 21b than a lower edge 21a at the rim 22. The sidewall's trapezoidal shape and inward angle of the front wall and the rear wall encourage nesting of multiple lids. As before, inwardly from the upper edge 22b, the top 23 extends to its peak where the ridges 23a intersect.

Figure 8:
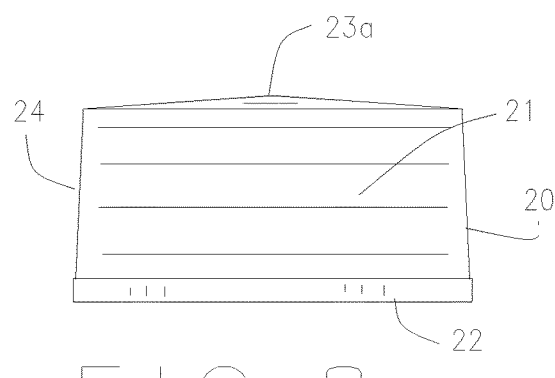
FIG. 8 is a side view of the lid opposite that of FIG. 7

FIG. 8 then describes the other sidewall 21, generally opposite that shown in FIG. 7. The other sidewall 21 extends from the rear wall 24 to the front wall 20. The two sidewalls are mutually spaced apart and oriented inwardly at the same angle for nesting purposes.

Figure 9:
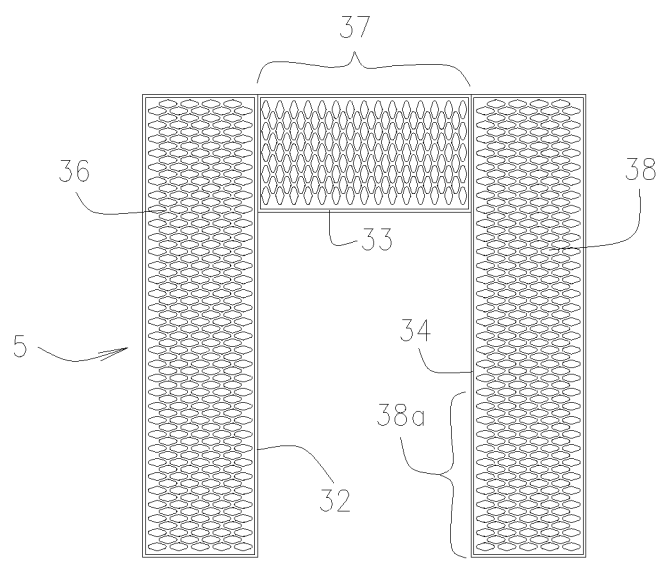
FIG. 9 is a plan view of the walkway of the present invention.

Turning to FIG. 9, it shows a plan view of the walkway 5 of the invention 1 removed from the base 3 and the lid 2. The walkway 5 has its U shape, here shown inverted, that is, with the opening downwardly in the figure. The walkway has its deck 30, generally planar, and following the inverted U shape as shown. The deck itself has a first deck 36 here shown to the left and of an elongated rectangular shape with perforations, a second deck 37 here shown towards the upper center and rightward of the first deck and of a rectangular shape with perforations also, and a third deck 38 here shown to the right of the figure and the right of the second deck and of an elongated rectangular shape with perforations as well. The first deck, the second deck, and the third deck have a common pattern of perforations. Inwardly of the deck, the walkway 5 has the first wall 32, the second wall 33, and the third wall 34 here shown on edge. The first wall 32 joins to the inner edge of the first deck, the second wall 33 joins to the interior end of the first wall and to the inner edge of the second deck, and the third wall 34 joins to the other end of the second wall and to the inner edge of the third deck. The first wall has a greater length than the third wall thus leaving a portion of the inner edge of the third deck visible, as at 38*a*. The pattern of perforations appears interrupted by linear members. The linear members have explanation below in FIG. 11.

Figure 10:
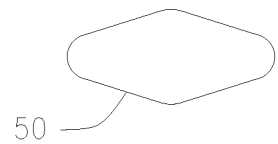
FIG. 10 is an enlarged detail view of the walkway.

The pattern of perforations begins with a single aperture 50 shown in FIG. 10. This figure is an enlarged detail view of the walkway 5, more particularly the deck 30, and its first deck 36, second deck 37, and third deck 38. The aperture has a preferred shape as shown with a compressed diamond like from with two rounded opposite corners, akin to a rounded rhombus. The aperture has sufficient width and height to admit particles of litter from a cat's paw but insufficient width and height to receive a cat's paw. The cat may walk upon the aperture but not lose a paw in it.

Figure 11:
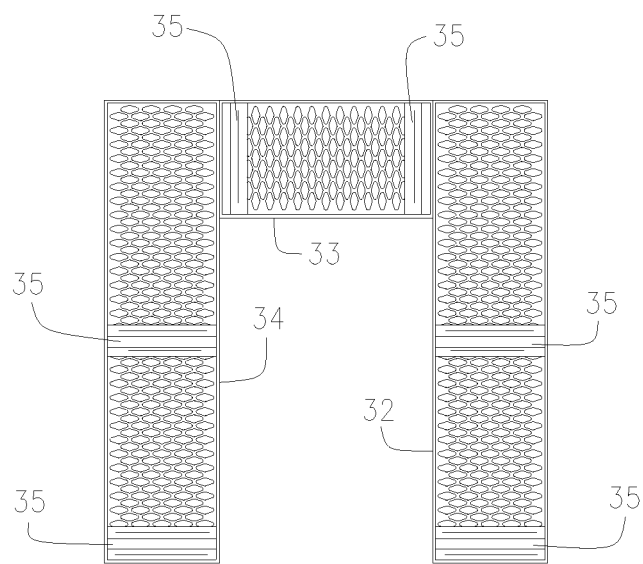
FIG. 11 is an opposite plan view of the walkway.

Turning the walkway over, FIG. 11 is an opposite plan view from that of FIG. 10. Here, the third deck 38 is to the left, the second deck 37 is to the upper center, and the first deck 36 is to the right. That makes on the interior edges of the walkway, the third wall 34 to the left, the second wall 33 to the center, and the first wall 32 to the right. A cat would enter within the walls from the left of this figure. As suggested above, the pattern of perforations of the apertures 50 has interruptions by linear members. The linear members take the form of the stiffeners 35 previously described as triangular but here shown on edge. The third deck begins with a stiffener 35 at the opening of the walkway's U like shape and has another stiffener intermediate. The third deck joins to the second deck upon a stiffener generally collinear with the third wall. The second deck ends at its joint to the first deck upon a stiffener generally collinear with the first wall. The first deck continues away from the second deck with a stiffener 35 intermediate and ending with a stiffener 35 at the opening of the walkway's U like shape. The stiffeners intermediate the first deck and the third deck are collinear and the stiffeners of the first deck and the third deck at the opening of the walkway's U like shape are also collinear.

Figure 12:
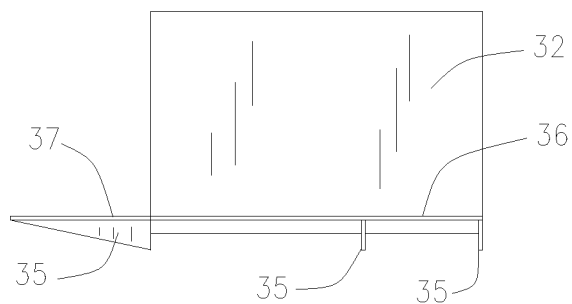
FIG. 12 is a side view of the walkway.

Rotating the walkway 5 to show its deck 30 generally horizontal, that is, left to right, FIG. 12 is a side view of the walkway with the cat's entry to the left. This view has the walkway 5 with its first deck 36 here shown on edge and the first wall 32 in the background. The first wall is perpendicular to the first deck and in a plane parallel to that of this figure. The first deck has its end stiffener to the left and its intermediate stiffener both shown with their tips in the foreground. The first deck merges with the second deck 37 to the right and is shown on edge. Beneath the first deck and second deck merger, the walkway has a stiffener showing its side view, that is, with its thick base towards the bottom of the rear catch and its thin point towards the rear wall of the base when assembled.

Figure 13:
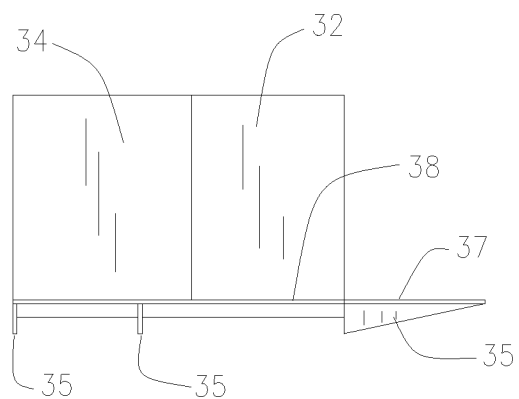
FIG. 13 is an opposite side view of the walkway.

FIG. 13 is an opposite side view of the walkway from FIG. 12 where the walkway has a 180 degree rotation. Here, the cat enters within the walkway towards the left of the figure. This view has the walkway 5 with its third deck 38 here shown on edge and the third wall 39 towards the left in the background. In the further background spaced behind the third wall, a portion of the first wall 32 appears to the right as the third wall has less length than the first wall. The third wall is perpendicular to the third deck and as before the first wall is perpendicular to the first deck. The third wall is in a plane parallel to that of this figure and the first wall is in a plane spaced behind that. The third deck merges with the second deck 37 to the left and is shown on edge. Beneath the third deck and second deck merger, the walkway has a stiffener 35 showing its triangular shape, that is, with its thick base towards the bottom of the rear catch and its thin point towards the rear wall of the base. The third deck also has its end stiffener to the right and its intermediate stiffener both shown with their tips in the foreground.

Figure 14:
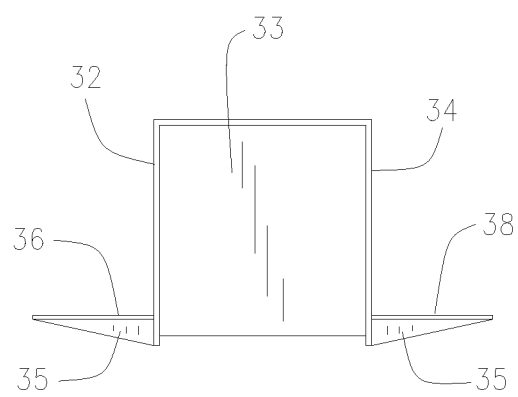
FIG. 14 is a front view of the walkway.

Keeping orientations straight, FIG. 14 is a front view of the walkway 5, that is, adjacent to the front wall 20 of the lid so that a cat enters to the left of this figure. The walkway has its first deck 36 spaced apart and coplanar with its third deck 38 to the right. The first deck and the third deck each have their end stiffeners 35 shown in their triangular shapes. The first wall 32, here shown on edge, joins to the first deck 36 above the wide base of the left stiffener as shown. Mutually parallel and spaced apart to the right, the third wall 34, here shown on edge, joins to the third deck 38 above the wide base of the right stiffener as shown. Between the first wall and the third wall, the second wall 33 spans in the background of this figure in a plane behind that of the two end stiffeners. The second wall appears in its full height and a portion of the second wall extends beneath the plane of the deck 30. As this is a front view, the third wall has less length than the first wall so that a cat may enter within the walkway past the end of the third wall, here on the right of the figure.

Figure 15:
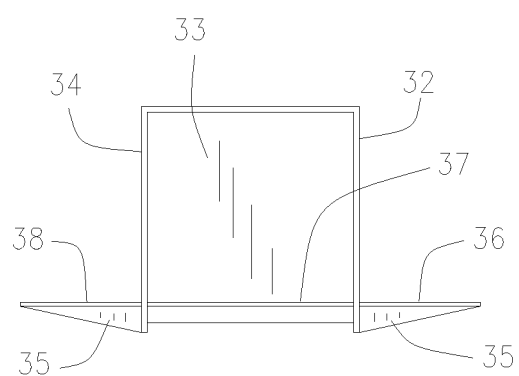
FIG. 15 is a rear view of the walkway.

Then, FIG. 15 is a rear view of the walkway 5, that is, opposite the front wall 20 of the lid so that a cat has entered to the right of this figure and may walk around the three walls. The walkway has its first deck 36 spaced apart and coplanar with its third deck 38 to the left. The first deck and the third deck each have their intermediate stiffeners 35 shown in their triangular shapes. The first wall 32, here shown on edge, joins to the first deck 36 above the wide base of the right stiffener as shown. Mutually parallel and spaced apart to the left, the third wall 34, here shown on edge, joins to the third deck 38 above the wide base of the left stiffener as shown. Between the first wall and the third wall, the second wall 33 spans in the foreground of this figure in a plane ahead of the two intermediate stiffeners. The second wall appears in its full height and a portion of the second wall extends beneath the plane of the second deck 37. As this is a rear view, the second wall has its own length and the first wall and the third wall merge with it. A cat walks along the walkway and along the second wall after entering the invention to do its business and then again when departing the invention having left litter behind through the apertures of the pattern of perforations.

Figures 16, 17:
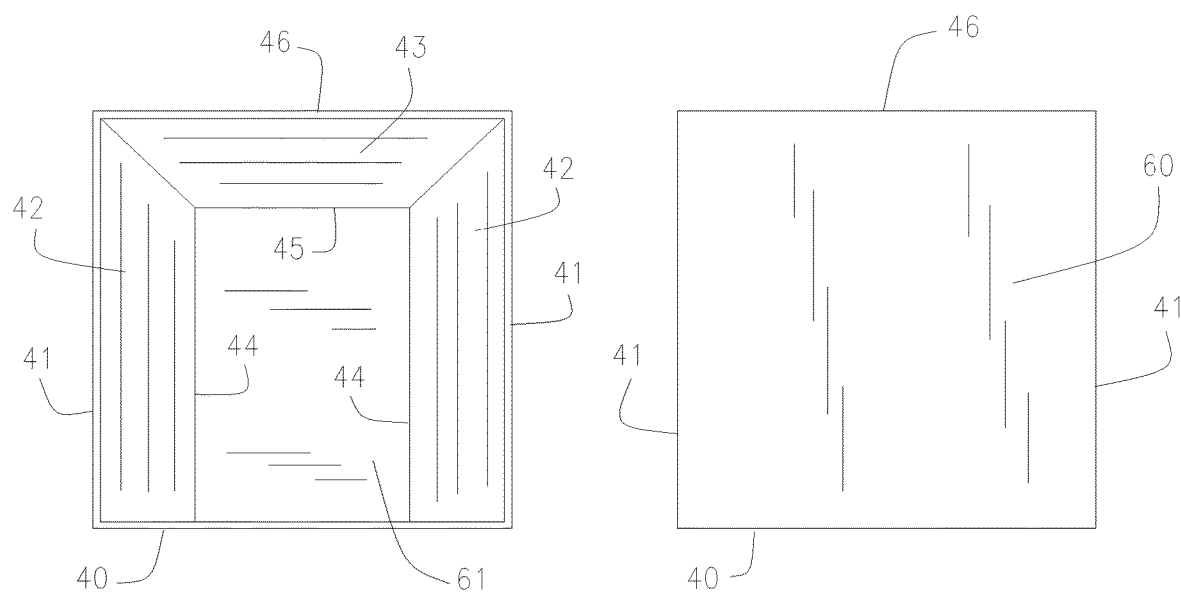
FIG. 16 is a plan view of the base of the present invention.
FIG. 17 is an opposite plan view of the base.

Having described the walkway 5, the description continues to the base 3 shown in FIG. 16 as a plan view. The base 3 has a generally square shape with the front wall 40, a mutually parallel and spaced apart rear wall 46, and two mutually parallel and spaced apart side walls 41 spanning from the front wall to the rear wall. The four walls mutually extend in the same direction, here towards the reader, from a bottom 60 of the base. The four walls have a generally perpendicular orientation to the bottom where the bottom is parallel to the plane of this figure. From the sidewalls 41 inwardly and beginning at the front wall 40, the base has its side catches 42. The side catches extend from the upper edges of the sidewalls into the plane of this figure towards the bottom 60. The side catches though stop short of spanning the full length of the front wall. The side catches each extend for a portion of the front wall and end at the inner side walls 44, here shown on edge. From the rear wall 46 inwardly and beginning at the sidewalls 41, the base has its rear catch 43. The rear catch merges with the side catches 42 along diagonal lines as shown, typically about a 45 degree bevel. The rear catch extends from the upper edge of the rear wall into the plane of this figure towards the bottom 60. The rear catch stops short of spanning the full length of the sidewalls but rather extends for just a portion of them and ends at the inner rear wall 45, here shown on edge and parallel to the front wall. Within the inner side walls and the inner rear wall, the base has a chamber 61 into which an owner places litter, then a cat enters, and that later collects litter dropped through the walkway and down the catches. The chamber has a rectangular shape generally much less than that of the square base.

Turning over the base, FIG. 17 is an opposite plan view than that of FIG. 16 and generally shows a square bottom 60. The bottom connects to the front wall 40, the two side walls 41, and a rear wall 46 mutually parallel and spaced apart from the front wall 40. The four walls are generally perpendicular to the bottom and extend into the plane of the figure. The base has its four walls upon a bottom and the lid has four matching walls that fit upon those of the bottom.

Figures 18, 19:
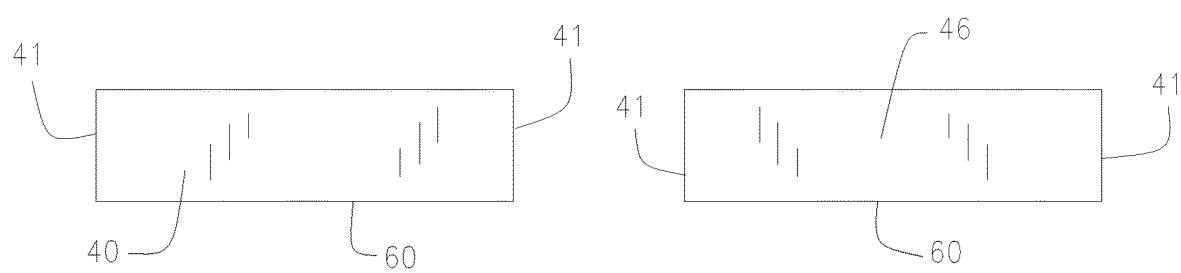
FIG. 18 is a front view of the base.
FIG. 19 is a back view of the base.

Next, FIG. 18 is a front view of the base 3 as a cat would see it before hopping into the invention. The base has its front wall 40 here shown as slightly trapezoidal in shape and narrowing away from the bottom 60. To the left and the right of the front wall, the base has its sidewalls 41 that tip inwardly slightly. In phantom, this figure shows the rear catch, the side catches, the inner side walls, and the inner rear wall as previously described.

Rotating the base, FIG. 19 is a back view of it with the rear wall 46 shown in the foreground. The rear wall has a similar trapezoidal shape as the front wall and has the two sidewalls joining to the rear wall. The sidewalls also extend upwardly from the bottom 60.

Figures 20, 21:
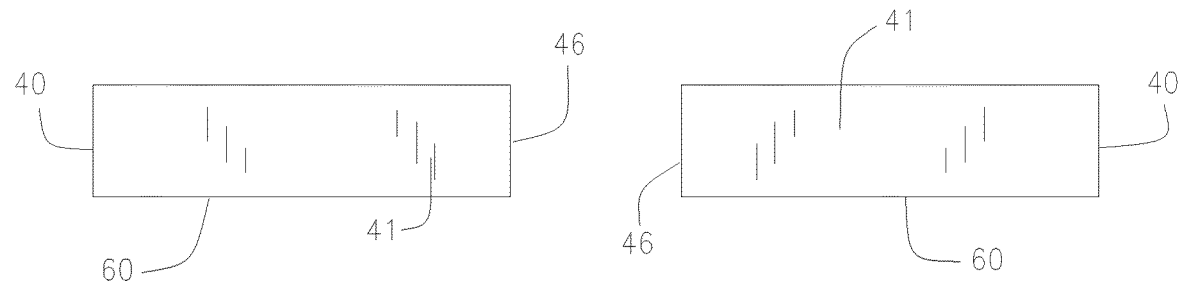
FIG. 20 is a side view of the base.
FIG. 21 is an opposite side view of the base of the invention.

Turning the base once more, FIG. 20 is a side view of the base 3 with the front wall 40 to the left of the figure. This view has a sidewall 41 shown in the foreground and the rear wall 46 to the right of the figure. The sidewall extends upwardly from the bottom 60. Also shown in phantom, this figure shows a side catch and an edge of the rear catch, the inner side walls, and an edge of the inner rear wall.

And, FIG. 21 is an opposite side view of the base 3 of the invention from that of FIG. 20. In summary, a cat enters the entry, walks around the walkway, hops into the bottom of the base, does its business, climbs onto the walkway, walks around the walkway in the opposite direction, and exits the box. All litter, that drops from the cat, enters the perforations of the walkway for collection in the chamber of the bottom of the base.

The present invention in its preferred and alternate embodiments stands ready to serve pets of all kinds, particularly cats, and their owners in various room types and buildings.

While a preferred embodiment of the long walk litter box has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, pine, birch plywood, textiles, carpeting, or another variety of wood may be used. Although providing a litter collection device for a home has been described, it should be appreciated that the long walk litter box herein described is also suitable for apartments, condominiums, dormitory rooms, houses, offices, light industrial facilities, warehouses, garages, motor pools, select mines, and the like where a pet, such as a cat, can find a home.

As a reminder to the reader, the invention is not a toy, it is not designed for a person to lean upon, stand upon, sit on, nor is it suitable for supporting a load exceeding twenty five pounds. The present invention is for concealing a typical house cat of twenty pounds or less in weight. The present invention may have its edges rounded over, formed smooth, or sanded smooth, and painted in a variety of colors.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A device collecting litter from a housecat, comprising:

a walkway having a perforated deck, said deck having a plurality of rounded rhombus perforations adapted to pass litter therethrough, said walkway having a U shape, a first wall with a length, a second wall with a length less than that of said first wall, and a third wall with a length less than that of said second wall, said first wall, said second wall, and said third wall being mutually perpendicular to said deck, said first wall, said second wall, and said third wall cooperatively forming a U shape, said first wall being mutually parallel and spaced apart from said third wall, and said second wall being perpendicular to said first wall and said third wall, said third wall positioning away from said entry, wherein the length of said third wall permits the housecat to enter said base, and the length of said first wall prevents the housecat from leaping from said base through said entry, said perforated deck having a first deck adjacent to said first wall, a second deck adjacent to said second wall, and a third deck adjacent to said third wall, said first deck, said second deck, and said third deck being mutually coplanar and said first deck, said second deck, and said third deck being perpendicular to said first wall, said second wall, and said third wall;

a base beneath said walkway, said base having catches therein adapted to receive litter, said base having a front wall, a rear wall mutually parallel and spaced apart from said front wall, two sidewalls mutually parallel and spaced apart and perpendicular to said front wall and said rear wall, each sidewall having a length, a bottom beneath and perpendicular to said front wall of said base, said rear wall of said base, and said sidewalls of said base, two side catches, each side catch extending from each of said sidewalls inwardly at a slope descending to a respective inner side wall, said inner side walls being mutually parallel and parallel to said sidewalls, a rear catch extending inwardly from said rear wall at a slope descending to an inner rear wall, and each of said inner side walls extending along the length of each sidewall from said inner rear wall to said front wall, said side catches and said rear catch forming a chamber within said base, said chamber being adjacent to said front wall, said side catches and said rear catch located beneath said walkway and being adapted to receive litter dropped thereon and adapted to guide the litter into said chamber; and a lid over said walkway and upon said base, said lid having an entry adapted to admit the housecat into said device, said first wall of said walkway positioning close to said entry, said lid having a front wall, said front wall having said entry, a rear wall spaced apart from said front wall, two sidewalls spaced apart and joining to said front wall and said rear wall, a top joining to said front wall, said rear wall, and said side walls, a rim upon said front wall, said rear wall, and said sidewalls and said rim engaging said base, wherein said lid remains in place upon said base during usage;

said first deck and said third deck, each having a right triangular stiffener away from said second deck and another right triangular stiffener proximate the center of said first deck and of said third deck, each of, said right triangular stiffeners orienting transverse to said first deck and to said third deck, respectively, said second deck having two right triangular stiffeners, one stiffener proximate said first deck and the other stiffener proximate said third deck, each of said stiffeners orienting perpendicular to said first deck, said second deck, and said third deck, respectively, said stiffeners mutually extending from said first deck, said second deck, and said third deck, respectively, and opposite said first wall, said second wall, and said third wall, and said stiffeners resting upon said catches and each having a bottom edge extending along the slope of one of the side catches and said rear catch respectively and orienting transverse to said first deck, said second deck, and said third deck respectively;

said third wall of said walkway positioning away from said entry, wherein the length of said third wall permits the housecat to enter said base and the length of said first wall prevents the housecat from leaping from said base through said entry;

said walkway commencing near said entry, wherein said entry is adapted to require the housecat entering said entry to walk for the full length of said first wall, said second wall, and said third wall to reach within said base, and then to walk the full length of said walkway back to said entry to exit from said device, thus preventing the housecat from leaving litter outside of said device; and said chamber defining a volume interiorly of said walkway adapted to receive the housecat.

* * * * *